United States Patent
Valliappan et al.

(10) Patent No.: US 9,332,465 B2
(45) Date of Patent: May 3, 2016

(54) LONG TERM EVOLUTION INTERFERENCE MANAGEMENT IN UNLICENSED BANDS FOR WI-FI OPERATION

(71) Applicant: QUALCOMM Incorporated, San Diego, CA (US)

(72) Inventors: Nachiappan Valliappan, San Diego, CA (US); Ahmed Kamel Sadek, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 80 days.

(21) Appl. No.: 14/275,505

(22) Filed: May 12, 2014

(65) Prior Publication Data

US 2015/0105067 A1    Apr. 16, 2015

Related U.S. Application Data

(60) Provisional application No. 61/891,227, filed on Oct. 15, 2013.

(51) Int. Cl.
| | |
|---|---|
| *H04W 24/08* | (2009.01) |
| *H04W 72/08* | (2009.01) |
| *H04W 36/06* | (2009.01) |
| *H04W 74/08* | (2009.01) |
| H04W 84/12 | (2009.01) |
| H04W 36/30 | (2009.01) |

(52) U.S. Cl.
CPC .......... *H04W 36/06* (2013.01); *H04W 74/0808* (2013.01); *H04W 36/30* (2013.01); *H04W 84/12* (2013.01)

(58) Field of Classification Search
CPC .... H04W 24/08; H04W 36/06; H04W 72/085
See application file for complete search history.

(56) References Cited

U.S. PATENT DOCUMENTS

| | | | |
|---|---|---|---|
| 8,537,798 B2 | 9/2013 | Tsfati et al. | |
| 2003/0198200 A1* | 10/2003 | Diener | H04L 1/1664 370/329 |
| 2007/0218950 A1* | 9/2007 | Codreanu | H04W 52/146 455/562.1 |
| 2010/0309867 A1* | 12/2010 | Palanki | H04L 5/0053 370/329 |
| 2012/0071200 A1* | 3/2012 | Bienas | H04W 48/20 455/525 |

(Continued)

FOREIGN PATENT DOCUMENTS

| | | |
|---|---|---|
| WO | 2012172476 A1 | 12/2012 |
| WO | WO-2013149387 A1 | 10/2013 |

OTHER PUBLICATIONS

International Search Report and Written Opinion—PCT/US2014/057663—ISA/EPO—Mar. 17, 2015.

*Primary Examiner* — Jinsong Hu
*Assistant Examiner* — Jean Chang
(74) *Attorney, Agent, or Firm* — Muncy, Geissler, Olds & Lowe, P.C.

(57) ABSTRACT

Systems and methods for improved interference management by Wi-Fi devices are disclosed. The interference management may be achieved by monitoring, by the Wi-Fi device, signaling energy on a communication channel in a frequency band associated with the Wi-Fi device, comparing the monitored signal energy with a known waveform signature corresponding to Long Term Evolution (LTE) operation, and identifying a presence of an LTE interferer on the communication channel in the frequency band associated with the Wi-Fi device based on the comparison.

23 Claims, 13 Drawing Sheets

(56) References Cited

U.S. PATENT DOCUMENTS

| | | | |
|---|---|---|---|
| 2012/0236736 A1* | 9/2012 | Frank | H04W 24/04 370/252 |
| 2012/0327850 A1 | 12/2012 | Wang et al. | |
| 2013/0155931 A1 | 6/2013 | Prajapati et al. | |
| 2013/0170476 A1* | 7/2013 | Baker | H04W 72/0406 370/336 |
| 2013/0208587 A1* | 8/2013 | Bala | H04W 16/14 370/230 |
| 2013/0272170 A1* | 10/2013 | Chatterjee | H04W 28/02 370/280 |
| 2013/0295989 A1* | 11/2013 | Smadi | H04W 72/1215 455/553.1 |
| 2014/0177606 A1* | 6/2014 | Bitran | H04W 72/0446 370/336 |

* cited by examiner

| UL/DL config | Period | Subframe (D – Downlink, S – Special, U – Uplink) | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | | D | S | U | D | D | D | S | U | D | D |
| 3 | 10 ms | D | S | U | U | U | D | D | D | D | D |
| 4 | | D | S | U | U | D | D | D | D | D | D |
| 5 | | D | S | U | D | D | D | D | D | D | D |
| 6 | 5 ms | D | S | U | U | U | D | S | U | U | D |
| SDL | n/a | D | D | D | D | D | D | D | D | D | D |

LTE Radio Frame UL/DL Configurations and Interference Patterns

LONG TERM EVOLUTION INTERFERENCE MANAGEMENT IN UNLICENSED BANDS FOR WI-FI OPERATION

CROSS-REFERENCE TO RELATED APPLICATIONS

The present Application for Patent claims the benefit of U.S. Provisional Application No. 61/891,227, entitled "METHODS TO DETECT LTE-U INTERFERENCE IN UNLICENSED BANDS FOR EFFICIENT 802.11 WLAN OPERATION," filed Oct. 15, 2013, assigned to the assignee hereof, and expressly incorporated herein by reference in its entirety.

INTRODUCTION

Aspects of this disclosure relate generally to telecommunications, and more particularly to interference management in mixed radio access technology environments and the like.

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, macro scale base stations (or macro (e)NodeBs) provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To extend cellular coverage indoors, such as for residential homes and office buildings, additional small coverage, typically low-power base stations have recently begun to be deployed to supplement conventional macro networks, providing more robust wireless coverage for mobile devices. These small cell base stations are commonly referred to as femto base stations, femto nodes, femto cell base stations, pico nodes, micro nodes, home NodeBs or home eNBs (collectively, H(e)NBs), etc., and deployed for incremental capacity growth, richer user experience, in-building or other specific geographic coverage, and so on.

Recently, small cell LTE operations, for example, have been extended into unlicensed frequency bands such as the Unlicensed National Information (UNIT) band used by Wireless Local Area Network (WLAN) technologies. This extension of small cell LTE operation is designed to increase spectral efficiency and hence capacity of the LTE system. However, it may also encroach on the operations of other radio access technologies that typically utilize the same unlicensed band, most notably IEEE 802.11x WLAN technologies generally referred to as "Wi-Fi."

There therefore remains a need for improved interference management by Wi-Fi devices operating in the increasingly crowded unlicensed frequency bands without requiring each device to be provisioned with additional and expensive LTE hardware.

SUMMARY

Systems and methods for providing for improved interference management by Wi-Fi devices are disclosed.

A method for interference management by a Wi-Fi device is disclosed. The method may comprise, for example, monitoring, by the Wi-Fi device, signaling energy on a communication channel in a frequency band associated with the Wi-Fi device, comparing the monitored signal energy with a known waveform signature corresponding to Long Term Evolution (LTE) operation, and identifying a presence of an LTE interferer on the communication channel in the frequency band associated with the Wi-Fi device based on the comparison.

An apparatus for interference management by a Wi-Fi device is also disclosed. The apparatus may comprise, for example, a signal energy monitor, a waveform comparator, and an interference identifier. The signal energy monitor may be configured to control monitoring, by the Wi-Fi device, signaling energy on a communication channel in a frequency band associated with the Wi-Fi device. The waveform comparator may be configured to compare the monitored signal energy with a known waveform signature corresponding to LTE operation. The interference identifier may be configured to identify a presence of an LTE interferer on the communication channel in the frequency band associated with the Wi-Fi device based on the comparison.

Another apparatus for interference management by a Wi-Fi device is also disclosed. The apparatus may comprise, for example, a processor and memory coupled to the processor for storing data. The processor may be configured to monitor, by the Wi-Fi device, signaling energy on a communication channel in a frequency band associated with the Wi-Fi device, compare the monitored signal energy with a known waveform signature corresponding to LTE operation, and identify a presence of an LTE interferer on the communication channel in the frequency band associated with the Wi-Fi device based on the comparison.

Another apparatus for interference management by a Wi-Fi device is also disclosed. The apparatus may comprise, for example, means for monitoring, by the Wi-Fi device, signaling energy on a communication channel in a frequency band associated with the Wi-Fi device, means for comparing the monitored signal energy with a known waveform signature corresponding to LTE operation, and means for identifying a presence of an LTE interferer on the communication channel in the frequency band associated with the Wi-Fi device based on the comparison.

A computer-readable medium comprising instructions, which, when executed by a processor, cause the processor to perform operations for interference management by a Wi-Fi device is also disclosed. The computer-readable medium may comprise, for example, code for monitoring, by the Wi-Fi device, signaling energy on a communication channel in a frequency band associated with the Wi-Fi device, code for comparing the monitored signal energy with a known waveform signature corresponding to LTE operation, and code for identifying a presence of an LTE interferer on the communication channel in the frequency band associated with the Wi-Fi device based on the comparison.

BRIEF DESCRIPTION OF THE DRAWINGS

The accompanying drawings are presented to aid in the description of embodiments of the invention and are provided solely for illustration of the embodiments and not limitation thereof.

FIG. 7 illustrates different LTE radio frame UL/DL configurations.

DETAILED DESCRIPTION

In relation to the background above, techniques are described herein to provide improved interference management for Wi-Fi devices operating in the unlicensed frequency bands along with other radio access technologies including Long Term Evolution (LTE), without the need for additional and expensive LTE hardware. As is explained in more detail below, using its existing Wi-Fi hardware, such devices may be configured to identify LTE interferers operating in the unlicensed spectrum, classify the type of interference observed, take appropriate avoidance or mitigation action to address it, and so on.

Various aspects of the invention are disclosed in the following description and related drawings directed to specific aspects disclosed. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. It will therefore be appreciated that the terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1:
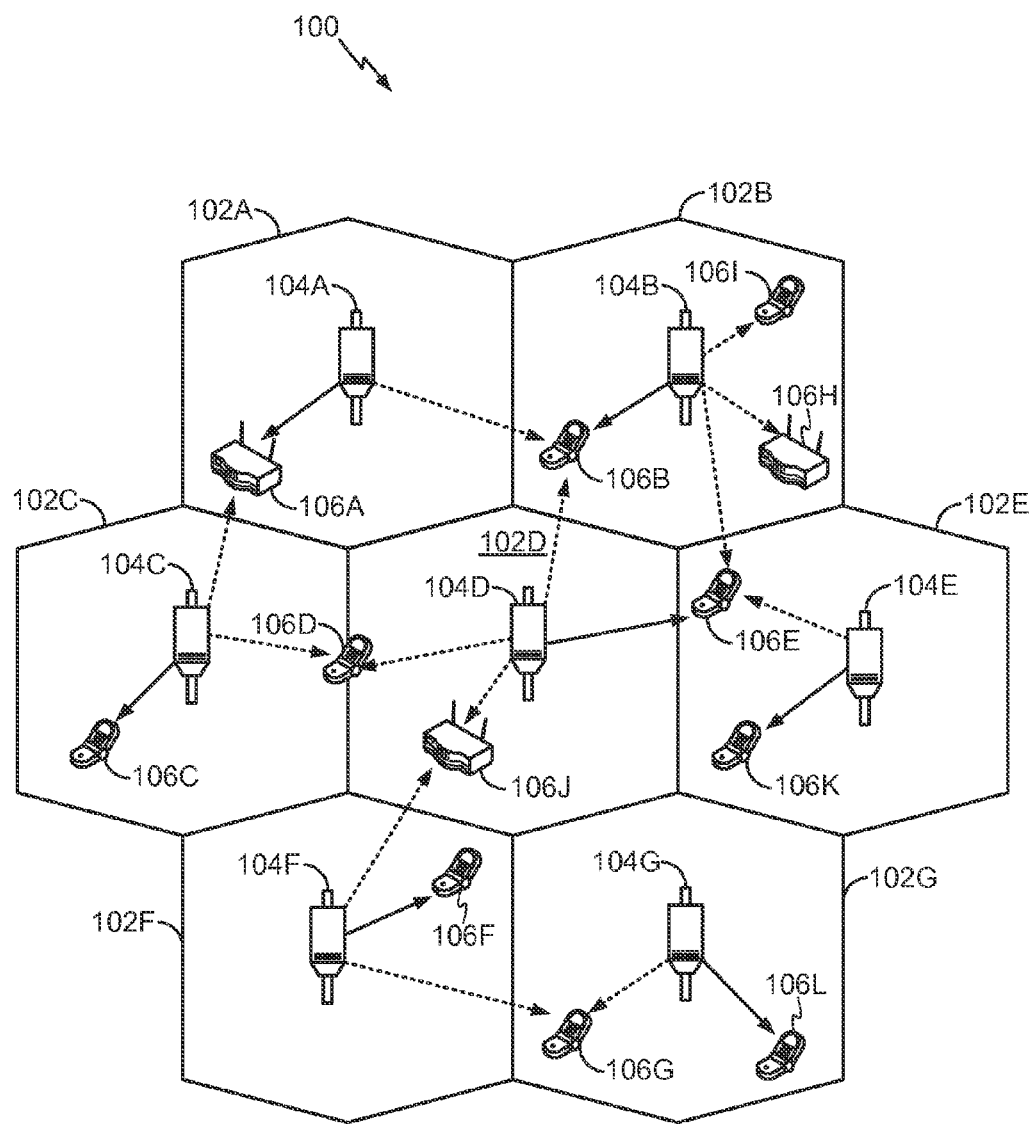
FIG. 1 illustrates an example wireless communication network demonstrating the principles of multiple access communication.

FIG. 1 illustrates an example wireless communication network demonstrating the principles of multiple access communication. The illustrated wireless communication network 100 is configured to support communication between a number of users. As shown, the wireless communication network 100 may be divided into one or more cells 102, such as the illustrated cells 102A-102G. Communication coverage in cells 102A-102G may be provided by one or more base stations 104, such as the illustrated base stations 104A-104G. In this way, each base station 104 may provide communication coverage to a corresponding cell 102. The base station 104 may interact with a plurality of user devices 106, such as the illustrated user devices 106A-106L.

Each user device 106 may communicate with one or more of the base stations 104 on a downlink (DL) and/or an uplink (UL). In general, a DL is a communication link from a base station to a user device, while an UL is a communication link from a user device to a base station. The base stations 104 may be interconnected by appropriate wired or wireless interfaces allowing them to communicate with each other and/or other network equipment. Accordingly, each user device 106 may also communicate with another user device 106 through one or more of the base stations 104. For example, the user device 106J may communicate with the user device 106H in the following manner: the user device 106J may communicate with the base station 104D, the base station 104D may then communicate with the base station 104B, and the base station 104B may then communicate with the user device 106H, allowing communication to be established between the user device 106J and the user device 106H.

The wireless communication network 100 may provide service over a large geographic region. For example, the cells 102A-102G may cover a few blocks within a neighborhood or several square miles in a rural environment. In some systems, each cell may be further divided into one or more sectors (not shown). In addition, the base stations 104 may provide the user devices 106 access within their respective coverage areas to other communication networks, such as the Internet or another cellular network. Each user device 106 may be a wireless communication device (e.g., a mobile phone, router, personal computer, server, etc.) used by a user to send and receive voice or data over a communications network, and may be alternatively referred to as an Access Terminal (AT), a Mobile Station (MS), a User Equipment (UE), etc. In the example shown in FIG. 1, the user devices 106A, 106H, and 106J comprise routers, while the user devices 106B-106G, 106I, 106K, and 106L comprise mobile phones. Again, however, each of the user devices 106A-106L may comprise any suitable communication device.

For their wireless air interfaces, each base station 104 may operate according to one of several Radio Access Technologies (RATs) depending on the network in which it is deployed, and may be alternatively referred to as a NodeB, evolved NodeB (eNB), etc. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

Figure 2:
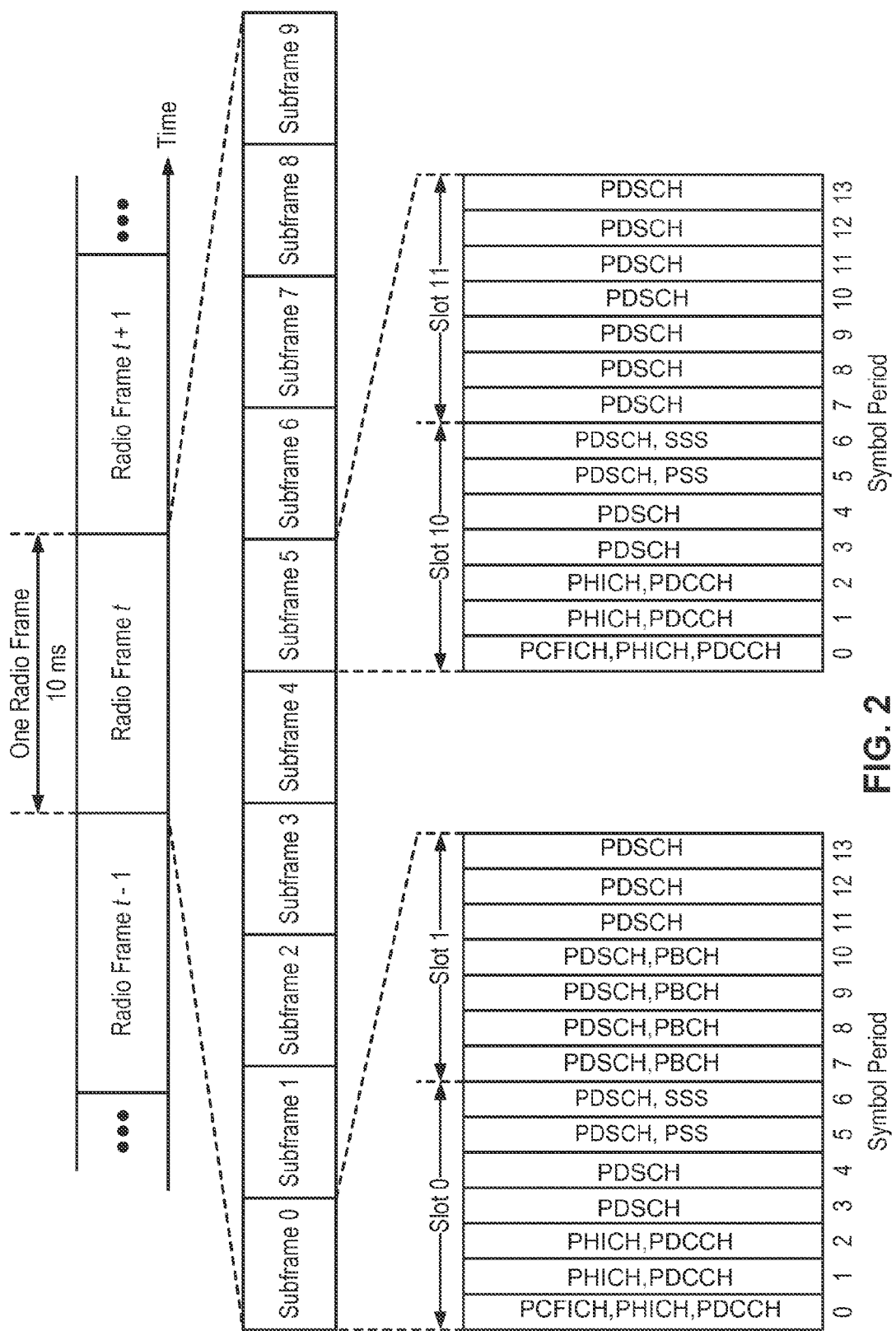
FIG. 2 is a block diagram conceptually illustrating an example frame structure in downlink LTE communications.

FIG. 2 is a block diagram conceptually illustrating an example frame structure in downlink LTE communications. In LTE, the base stations 104 of FIG. 1 are generally referred to as eNBs and the user devices 106 are generally referred to as UEs. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
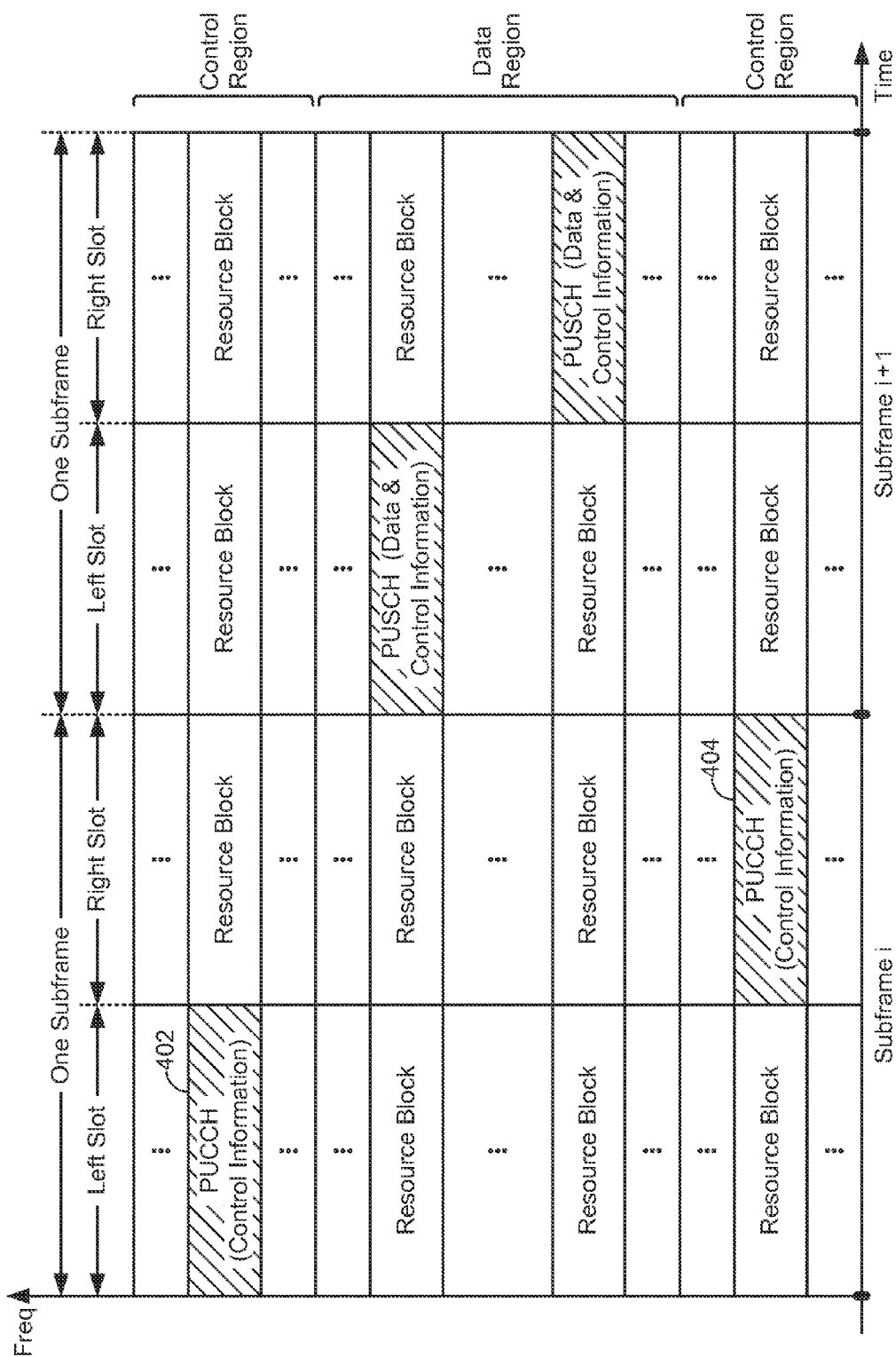
FIG. 3 is a block diagram conceptually illustrating an example frame structure in uplink LTE communications.

FIG. 3 is a block diagram conceptually illustrating an example frame structure in uplink LTE communications. The available resource blocks (which may be referred to as RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

The PSS, SSS, CRS, PBCH, PUCCH, and PUSCH in LTE on an unlicensed band are otherwise the same or substantially the same as in LTE as described in 3GPP TS 36.211, entitled "Evolved Universal Terrestrial Radio Access (E-UTRA); Physical Channels and Modulation," which is publicly available.

As discussed briefly in the background above, smaller scale coverage base stations referred to as "small cell" base stations have recently begun to be deployed in conjunction with conventional larger scale coverage base stations such as those illustrated in FIG. 1, which may therefore be referred to as "macro cell" base stations. As a user device moves through mixed communication network environments providing both macro cell and small cell coverage, the user device may be served in certain locations by macro cell base stations and at other locations by small cell base stations. Small cell base stations may be used to provide significant capacity growth, in-building coverage, and in some cases different services for a more robust user experience.

Figure 4:
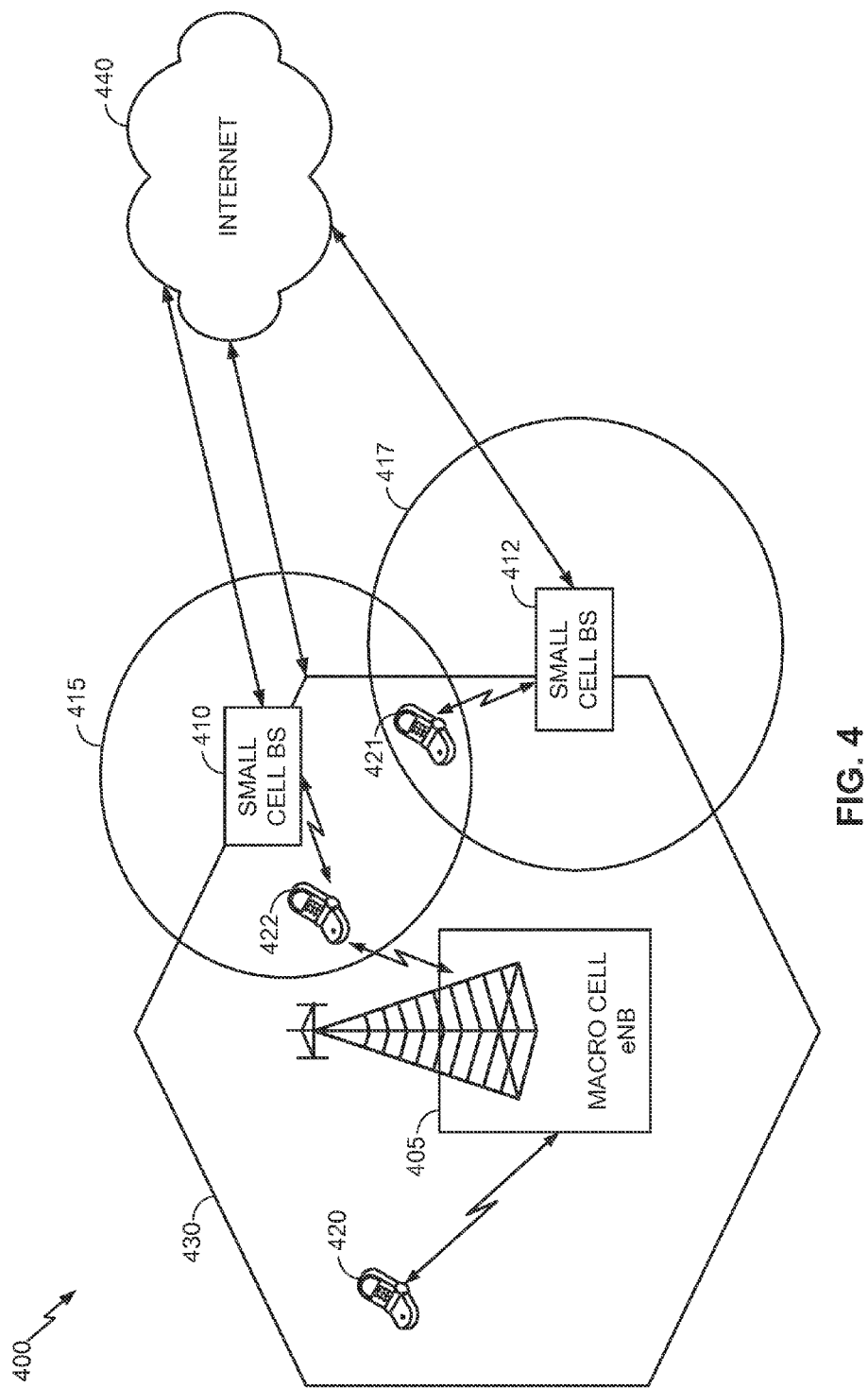
FIG. 4 illustrates an example mixed LTE communication network environment in which small cell base stations are deployed in conjunction with macro cell eNBs.

FIG. 4 illustrates an example mixed LTE communication network environment in which small cell base stations are deployed in conjunction with macro cell eNBs. As shown, an eNB 405 may provide communication coverage to one or more UEs, such as the illustrated UEs 420, 421, and 422, within a macro cell coverage area 430 (as discussed above in more detail with reference to FIG. 1), while small cell base stations 410 and 412 may provide their own communication coverage within respective small cell coverage areas 415 and 417, with varying degrees of overlap among the different coverage areas. It is noted that certain small cells may be restricted in some manner, such as for association and/or registration, and may therefore be referred to as Closed Subscriber Group ("CSG") cells. In this example, at least some UEs, such as the illustrated UE 422, may be capable of operating both in macro environments (e.g., macro areas) and in smaller scale network environments (e.g., residential, femto areas, pico areas, etc.) as shown.

Turning to the illustrated connections in more detail, the UE 420 may generate and transmit a message via a wireless link to the eNB 405, the message including information related to various types of communication (e.g., voice, data, multimedia services, etc.). The UE 422 may similarly communicate with the small cell base station 410 via a wireless link, and the UE 421 may similarly communicate with the small cell base station 412 via a wireless link. The eNB 405 may also communicate with a corresponding wide area or external network 440 (e.g., the Internet), via a wired link or via a wireless link, while the small cell base stations 410 and 412 may also similarly communicate with the network 440, via their own wired or wireless links. For example, the small cell base stations 410 and 412 may communicate with the network 440 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, or some other link.

The network 440 may comprise any type of electronically connected group of computers and/or devices, including, for example, the following networks: Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 440 includes network variations such as the public Internet, a private network within the Internet, a secure network within the Internet, a private network, a public network, a value-added network, an intranet, and the like. In certain systems, the network 440 may also comprise a Virtual Private Network (VPN).

Accordingly, it will be appreciated that the eNB 405 and/or either or both of the small cell base stations 410 and 412 may be connected to the network 440 using any of a multitude of devices or methods. These connections may be referred to as the "backbone" or the "backhaul" of the network, and may in some implementations be used to manage and coordinate communications between the eNB 405, the small cell base station 410, and the small cell base station 412. In this way, depending on the current location of the UE 422, for example, the UE 422 may access the communication network 440 by the eNB 405 or by the small cell base station 410.

In this example, the eNB 405 and the small cell base stations 410 and 412 each operate in accordance with an LTE implementation. Typically, such LTE operations are confined to one or more licensed frequency bands that have been reserved (e.g., by the Federal Communications Commission (FCC)) for such communications. However, certain communication systems, in particular those employing small cell base stations as in the design of FIG. 4, have extended LTE operations into unlicensed frequency bands such as the Unlicensed National Information Infrastructure (UNIT) band used by Wireless Local Area Network (WLAN) technologies. For convenience, this type of LTE operation on an unlicensed RF band may be referred to herein as LTE/LTE Advanced in unlicensed spectrum, or simply as "LTE" in the surrounding context.

In some systems, LTE operation may be supplemental to licensed band operation by employing one or more unlicensed carriers operating in an unlicensed portion of the wireless spectrum in conjunction with an anchor licensed carrier operating in a licensed portion of the wireless spectrum (e.g., LTE Supplemental DownLink (SDL)), or it may be a standalone configuration operating exclusively in an unlicensed portion of the wireless spectrum without the use of an anchor licensed carrier (e.g., LTE Standalone). SDL in general refers to operation in a carrier aggregation mode where the primary carrier is an FDD paired DL and UL, and an additional DL carrier is used as the SDL. In an LTE implementation including unlicensed spectrum operation, the SDL carrier may be an unlicensed carrier and the primary FDD UL/DL carrier may be a licensed carrier. When carriers are aggregated, each carrier may be referred to as a component carrier.

The extension of small cell LTE operation into unlicensed frequency bands such as the UNII band may increase spectral efficiency and hence capacity of the LTE system. As discussed briefly in the background above, however, it may also encroach on the operations of other radio access technologies that typically utilize the same unlicensed band, most notably IEEE 802.11x WLAN technologies generally referred to as "Wi-Fi."

Figure 5:
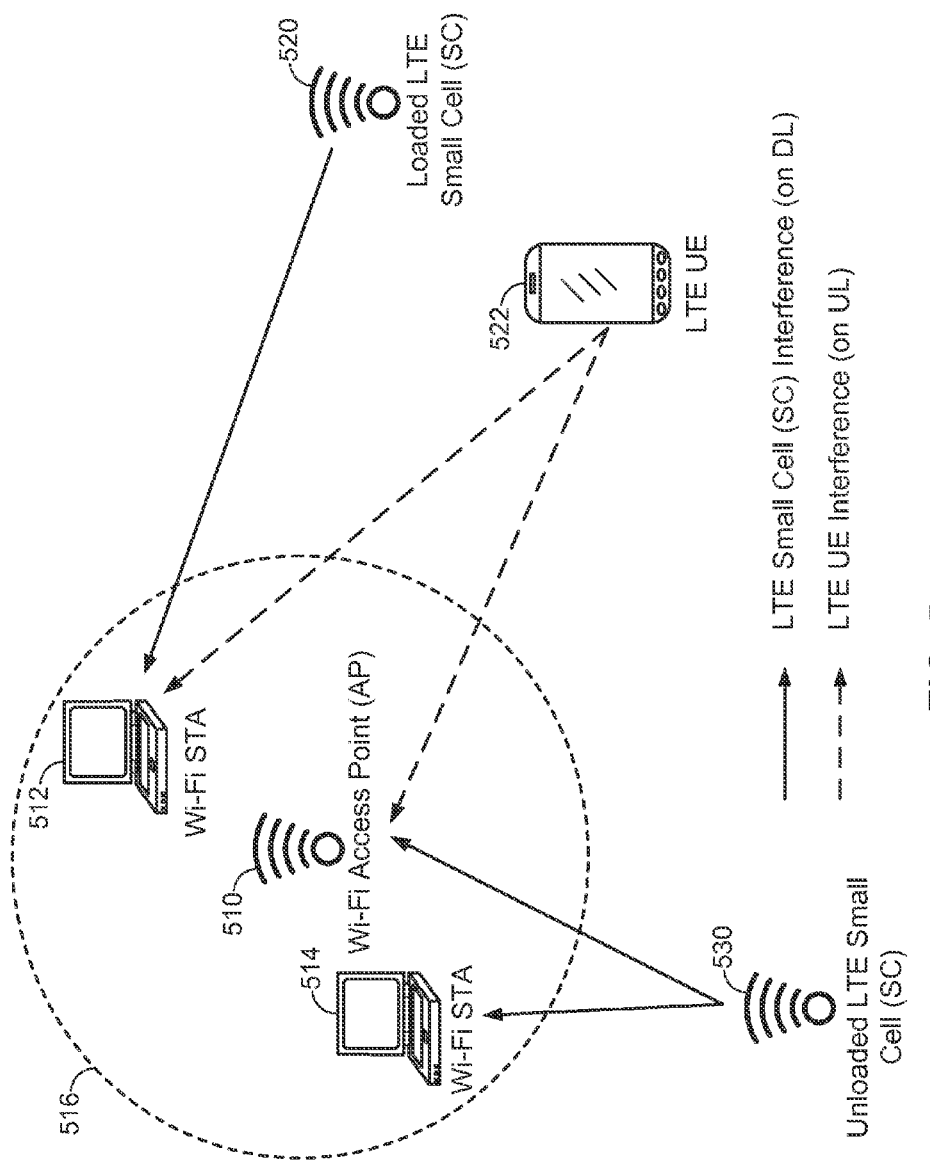
FIG. 5 illustrates an example mixed communication network environment in which LTE small cells (LTE SCs) are deployed in proximity with Wi-Fi access points (Wi-Fi APs).

FIG. 5 illustrates an example mixed communication network environment in which LTE small cells (LTE SCs) are deployed in proximity with Wi-Fi access points (Wi-Fi APs). For illustration purposes, an example Wi-Fi AP 510 is shown as serving various subscriber stations (STAs) 512 and 514, while a loaded LTE SC 520 is shown as serving a UE 522 in proximity to the Wi-Fi AP 510 and an unloaded LTE SC 530 also operates nearby. This communication environment creates several sources of potential co-channel interference for the Wi-Fi AP 510.

As shown, one source of co-channel interference is DL signaling by the unloaded LTE SC 530. This signaling generally includes broadcasted synchronization and discovery signaling such as the PSS signals, SSS signals, and CRS signals described above with reference to FIG. 2. This interference may impact any Wi-Fi device in range, including the Wi-Fi AP 510 as well as the STA 514. Another source of co-channel interference is DL signaling from the loaded LTE SC 520. This signaling generally includes not only the same broadcasted synchronization and discovery signaling, but also data transmissions to the UE 522. This interference may similarly impact any Wi-Fi device in range, including the STA 512. Another source of co-channel interference is UL signaling from the UE 522. This signaling generally includes data and control information such as the PUSCH signals and PUCCH signals described above with reference to FIG. 2. This interference may similarly impact any Wi-Fi device in range, including the Wi-Fi AP 510 as well as the STA 512.

According to various designs provided herein, the Wi-Fi AP 510 may therefore be specially programmed or configured to identify the presence of LTE interference and take appropriate action to address it, without the need for additional and expensive LTE-specific hardware such as a dedicated LTE receiver. The Wi-Fi AP 510 may also be specially programmed or configured to classify the type of LTE interference identified and tailor any interference avoidance or mitigation actions to better address the type of interference observed.

Figure 6:
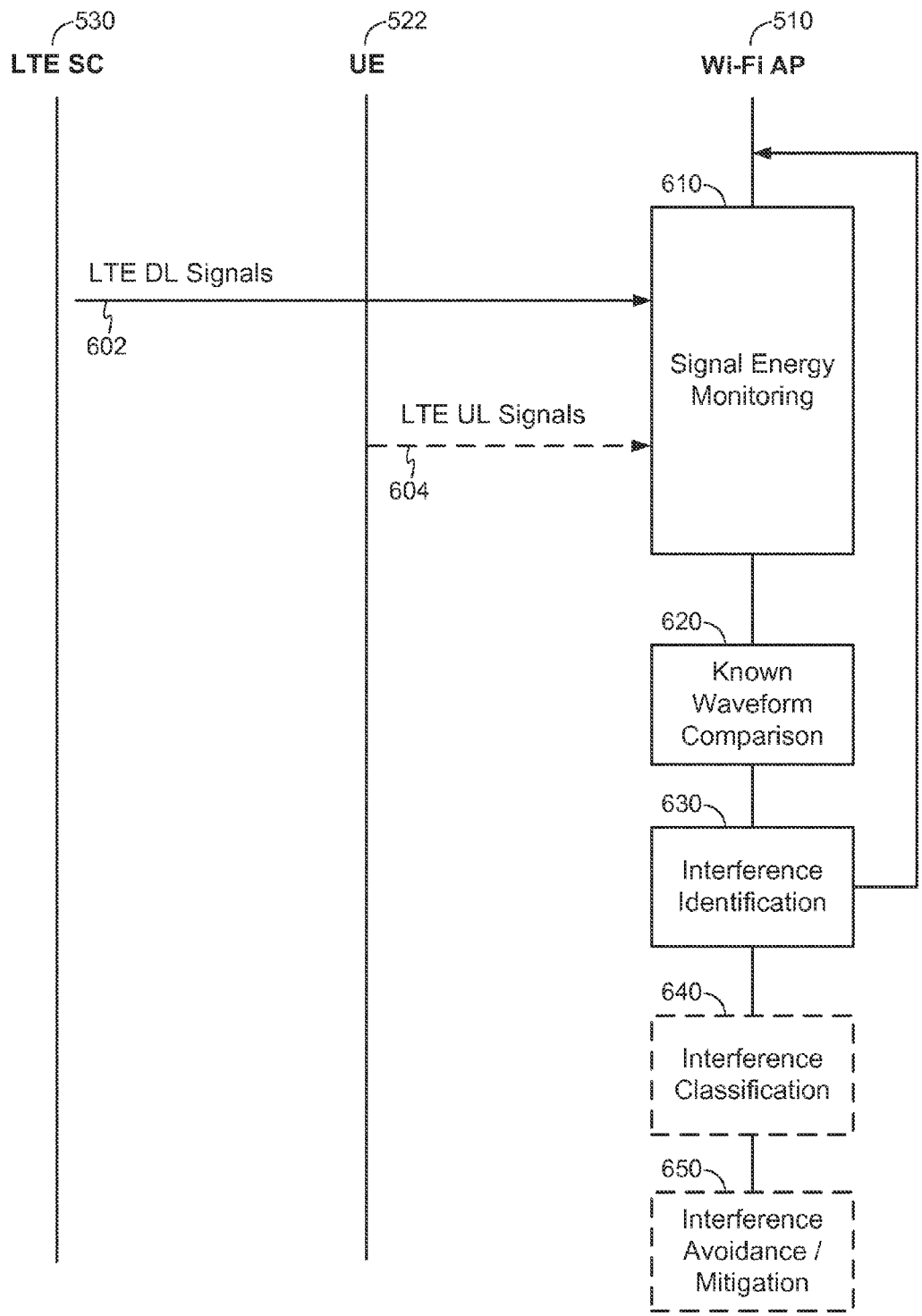
FIG. 6 is a signaling flow diagram illustrating an example method of managing co-channel LTE interference by a Wi-Fi AP in a wireless communication network.

FIG. 6 is a signaling flow diagram illustrating an example method of managing co-channel LTE interference by a Wi-Fi AP in a wireless communication network. As will be discussed in more detail below, an equivalent method may be performed by any Wi-Fi device including both Wi-Fi APs and STAs, acting alone or in combination (e.g., STA-assisted). For illustration purposes, however, FIG. 6 is shown in the context of operations performed by the Wi-Fi AP 510 of FIG. 5.

In this example, the Wi-Fi AP 510 monitors signaling energy (e.g., the Fast Fourier Transform (FFT) energy output) on a communication channel in a frequency band associated with its typical operations, such as the UNII band or some other unlicensed frequency band (block 610). Because of the proximity of the LTE SC 530 to the Wi-Fi AP 510, as shown in FIG. 5, the monitored signal energy includes LTE signaling 602 from the LTE SC 530. Although the Wi-Fi AP 510 is not provisioned with a dedicated LTE receiver, it is able to monitor signaling energy within its frequency band of operation using its own WLAN receiver circuitry.

Since the Wi-Fi AP 510 is not synced to the LTE subframe boundary, an appropriate measurement interval may be selected and repeated based on the LTE frame structure to more accurately capture useful signal energy information. For example, the measurement interval may span at least one LTE slot duration (i.e., 0.5 ms) and at most one LTE subframe duration (i.e., 1 ms). The measurements may then be repeated in accordance with the LTE subframe periodicity (i.e., 1 ms) for a duration in accordance with the LTE frame duration (i.e., 10 ms). In some designs, the measurements may be aggregated over multiple LTE frame duration periods, for example, with random time offsets for more confidence.

Once the measurements are collected, the Wi-Fi AP 510 can compare the monitored signal energy with a known waveform signature (which may also be referred to as a fingerprint) corresponding to LTE (block 620) and identify therefrom the presence of any LTE interferers (block 630). For example, the DL PSS signals, SSS signals, and CRS signals described above with reference to FIG. 2 are each broadcast with a characteristic periodicity that can be used to define such a waveform signature pattern. PSS/SSS signals are sent on the center 62 subcarriers of all component carriers in the last OFDM symbol of the 1st slot and 11th slot (i.e., twice every 10 ms) in every radio frame by the LTE SC 530 irrespective of the operating bandwidth. The periodicity of the FFT energy output in center frequency bins can accordingly be pattern matched to identify the presence of nearby unloaded LTE SCs such as the LTE SC 530 based on a PSS/SSS signature pattern. Similarly, CRS signals are sent on OFDM symbols 0, 4, 7, and 11 in every DL subframe on all component carriers by the LTE SC 530 and appear wideband to the Wi-Fi AP 510 due to the different subcarrier spacing (WLAN subcarrier spacing=312.5 kHz, whereas LTE subcarrier spacing=15 kHz). The periodicity of the FFT energy output can be similarly pattern matched to identify the presence of nearby unloaded LTE SCs such as the LTE SC 530 based on a PSS/SSS, CRS signature pattern.

Returning to FIG. 6, as another example, certain LTE UL signals 604 transmitted by the UE 522 such as PUCCH signals may also be sent with a characteristic periodicity that can be used to define a known waveform signature pattern. Hopping PUCCH transmissions, for example, which are out-of-band for Wi-Fi, may be used to detect the presence of a nearby LTE UE such as the UE 522. Downlink signaling from the LTE SC 530, however, may be easier to reliably detect compared to uplink signaling by the UE 522 because LTE small cell transmission power is usually significantly higher than UE transmission power, LTE SCs are guaranteed to transmit CRS symbols in every DL subframe on all component carriers, there is generally a DL-UL traffic asymmetry, and so on. Detecting LTE SC transmissions may also be more critical compared to detecting UE transmissions because unloaded cell transmissions are more frequent and higher power. In most scenarios, the LTE SC transmissions cause more harm to a Wi-Fi device than do nearby UE transmissions.

In either case, the interference identification may be repeated over a period of time as shown in FIG. 6 for accuracy, as bursty data traffic may temporarily obscure any pattern matching. For example, on the downlink, PDSCH data transmissions may be present during some subframes and may wash out the periodicity of PSS, SSS, and CRS signal energies in those subframes. Similarly, on the uplink, PUSCH data transmissions may be present during some subframes and may wash out the periodicity of PUCCH signal energies in those subframes. Nevertheless, data transmissions are generally intermittent whereas control signaling and in particular pilot/discovery signaling are fairly constant. Accordingly, measurements repeated over a sufficient number of iterations will tend to produce reliable pattern matching results.

In some designs, once an LTE interferer has been identified, the Wi-Fi AP 510 may perform further match processing on the resulting signal energy pattern to classify the type of interference being observed into one of several possible LTE configurations (block 640). The different LTE configurations correspond to different UL/DL sharing patterns of the different subframes making up each radio frame. As discussed in more detail below, each different LTE configuration presents a different interference pattern that may be managed differently by the Wi-Fi AP 510 once identified.

FIG. 7 illustrates different LTE radio frame UL/DL configurations and their corresponding interference patterns. Here, 'D' indicates a DL subframe designated for DL transmissions (i.e., eNB to UE communications), 'U' indicates an UL subframe for UL transmissions (i.e., UE to eNB communications), and 'S' indicates a special subframe. A special subframe may include DL OFDM symbols, a guard period, and UL OFDM symbols.

As discussed in more detail above, when the LTE SC 530 operates in SDL mode, the unlicensed spectrum may be utilized only for DL transmissions. Accordingly, each of the subframes 0-9 of a given radio frame in an SDL configuration is designated 'D' for DL transmission. By contrast, when the LTE SC 530 operates in Standalone mode, the unlicensed spectrum may be utilized for both DL and UL transmissions, according to one of the illustrated Time Division Duplexing (TDD) UL/DL configurations. There are seven total such configurations defined for LTE-TDD spectrum sharing, indexed as UL/DL configurations 0-6. As shown, UL/DL configurations 0-2 and 6 repeat their characteristic pattern twice within a given subframe, and therefore have effective periodicities of 5 ms. Meanwhile, UL/DL configurations 3-5 have respective characteristic patterns that span an entire subframe, and therefore have effective periodicities of 10 ms.

Returning to FIG. 6, the Wi-Fi AP 510 may classify the type of interference being observed (block 640) by comparing the monitored signal energy pattern to the different UL/DL configurations in FIG. 7. In contrast to the initial interference identification which may operate at a granularity commensurate with the periodicity of the LTE signals themselves (i.e., on the order of individual subframes), the interference classification may operate at a larger granularity commensurate with the periodicity of the different UL/DL configurations (i.e., on the order of whole frames). By determining the durations between time periods identified as matching DL subframe interference patterns, for example, the Wi-Fi AP 510 may distinguish DL subframes (where such interference is expected) and UL subframes (where such interference is not expected), and correlate the observed UL/DL pattern to one of the different UL/DL configurations in FIG. 7. Conversely, by determining the durations between time periods identified as matching UL subframe interference patterns, the Wi-Fi AP 510 may also distinguish UL subframes (where such interference is expected) and DL subframes (where such interference is not expected), and correlate the observed UL/DL pattern to one of the different UL/DL configurations in FIG. 7.

Based on the identification and, in some cases, classification of an LTE interferer, the Wi-Fi AP 510 may perform interference avoidance and/or mitigation as appropriate (block 650). For example, in order to avoid LTE interference identified on a communication channel, the Wi-Fi AP 510 may perform smart channel selection and switch operating channels in the presence of such interference. The switching may be based on a switching threshold (e.g., an interference power threshold, a PER threshold, etc.) associated with the presence of the LTE interferer. The Wi-Fi AP 510 may also block or prevent transmission to or from its associated STAs 512, 514 during high interference periods. This may be achieved, for example, by sending a Clear-To-Send-to-Self (CTS2S) message to reserve the communication medium and prevent traffic in the Wi-Fi network during such time periods.

The Wi-Fi AP 510 may also perform other more advanced interference mitigation techniques based on the classification of the LTE interference and knowledge of the UL/DL configuration being employed. For example, the Wi-Fi AP 510 may perform dual-rate control based on the UL/DL configuration, whereby separate power tracking loops are maintained for (1) packet transmissions during LTE DL subframes and (2) packet transmissions during LTE UL subframes. As discussed above, the observed interference will generally be different between DL subframes in which the LTE SCs themselves transmit and UL subframes in which UEs may or may not transmit. Separate power tracking loops enables more individualized tracking for these different time periods, rather than requiring them to be indiscriminately averaged together.

As another example, the Wi-Fi AP 510 may schedule the different STAs 512, 514 at different times depending on the interference pattern. For instance, if the STA 514 suffers from larger DL interference than the STA 512, it can be scheduled during known UL periods of the determined UL/DL configuration while the STA 512 with less interference may be more flexible and scheduled anytime. The Wi-Fi AP 510 may also align important transmissions such as beacons with UL timing to reduce the impact from DL interference (e.g., if STA feedback identifies more interference on the DL).

As another example, the Wi-Fi AP 510 may perform smart Transmission Opportunity (TXOP) scheduling to align (and/or shorten) its communications with the known or at least approximately known UL/DL subframe boundaries of an identified UL/DL configuration. This helps to avoid or at least reduce TXOP leakage across UL/DL subframe boundaries and again provides a more consistent interference level across transmissions, which can be addressed via conventional techniques such as lowering the data rate for increased integrity, etc.

As another example, if the Wi-Fi AP 510 is equipped with multiple antennas, it may perform interference nulling (e.g., using directional transmission/reception). In this way, it may estimate the direction of a strong LTE SC and null it out. Given the relative stationarity of both LTE SCs and Wi-Fi APs, nulling may provide a fairly consistent reduction in interference. The estimation may be performed based CRS transmissions, for example, where CRS is repeated and the received signals can be canceled.

As discussed above, it will be appreciated that the techniques herein allow the Wi-Fi device to identify an LTE interferer by monitoring and processing (either directly or assisted) signaling energy, without the need for additional and expensive LTE-specific hardware such as a dedicated LTE receiver. This is in contrast to conventional techniques for Wi-Fi APs that have access to LTE receiver circuitry, such as those that are physically or logically "co-located" with an LTE SC, where, instead of monitoring and processing signaling energy, the Wi-Fi AP may simply use the LTE SC circuitry to identify LTE transmissions on its operating channel (e.g., using a Network Listen Module (NLM) of the LTE SC or one of its associated UEs) and query the LTE SC for its UL/DL configuration.

Figure 8:
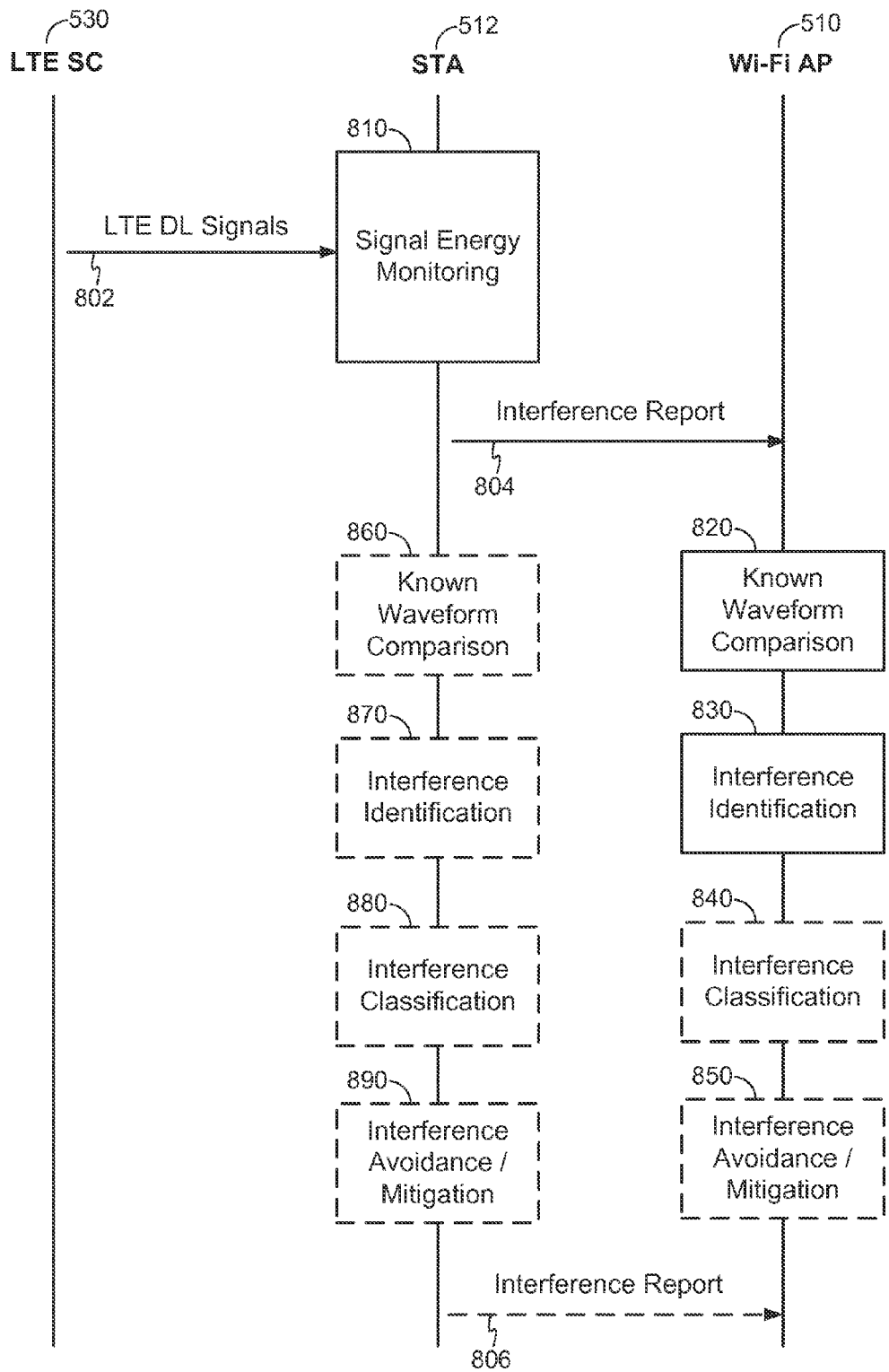
FIG. 8 is a signaling flow diagram illustrating an example of an STA-assisted method of managing co-channel LTE interference by a Wi-Fi AP in a wireless communication network.

FIG. 8 is a signaling flow diagram illustrating an example of an STA-assisted method of managing co-channel LTE interference by a Wi-Fi AP in a wireless communication network. This example is similar to that described above with reference to FIG. 6 except that the Wi-Fi AP 510 is assisted by the STA 512, which may perform some of the operations. In this example, it is the STA 512 that monitors signaling energy on a communication channel in the unlicensed frequency band (block 810). Because of the proximity of the LTE SC 520 to the STA 512, as shown in FIG. 5, the monitored signal energy includes LTE signaling 802 from the LTE SC 520. Again, the STA 512 need not be provisioned with a dedicated LTE receiver, as it is able to nevertheless monitor signaling energy within its frequency band of operation using its own WLAN receiver circuitry.

Based on the monitored signal energy, the STA 512 may generate an interference report 804 and send it to the Wi-Fi AP 510 for further processing. The interference report 804 may take the form of raw measurement data simply collected and forwarded on by the STA 512, or may be further processed as desired. For example, the interference report 804 may include a noise histogram over successive (e.g., 10 ms) time periods with randomized measurement start times that enable the Wi-Fi AP 510 to determine if the histogram has a periodic pattern, or the interference report 804 may be a Radio Resource Measurement (RRM) report as defined in IEEE 802.11k.

The Wi-Fi AP 510 may then perform further processing including comparing the monitored signal energy from the interference report with a known waveform signature pattern corresponding to LTE (block 820), identifying therefrom the presence of any LTE interferers (block 830), classifying the type of interference being observed (block 840), and performing interference avoidance and/or mitigation as appropriate (block 850). Alternatively, some or all of these processing operations may be performed by the STA 512 itself (blocks 860-890), upon which a final (or other intermediate) interference report 806 may be generated and sent to the Wi-Fi AP 510 as shown.

Figure 9:
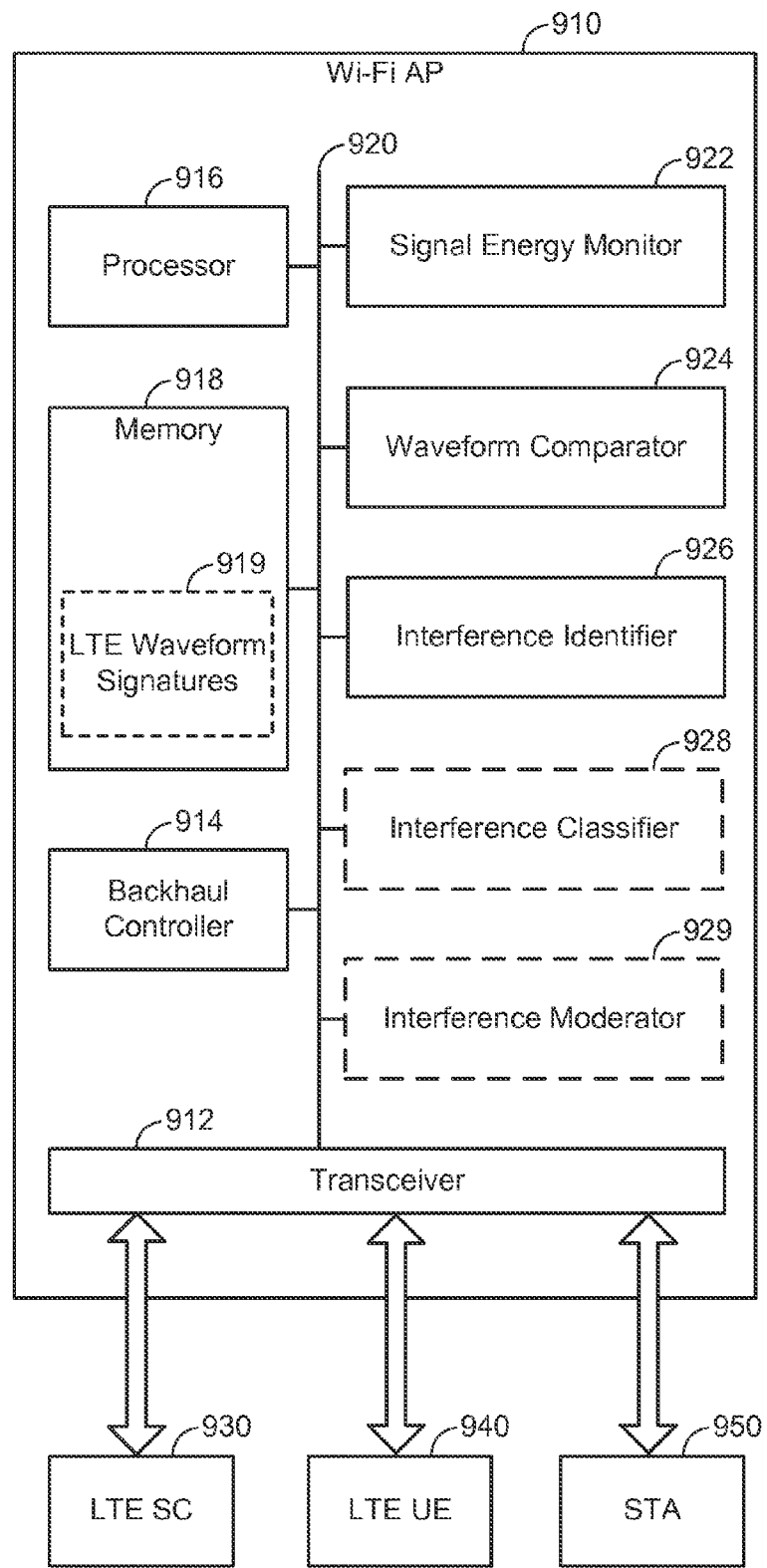
FIG. 9 illustrates the configuration of an example Wi-Fi AP for managing co-channel LTE interference in a wireless communication network.

FIG. 9 illustrates the configuration of an example Wi-Fi AP for managing co-channel LTE interference in a wireless communication network. In this example, a Wi-Fi AP 910 is deployed in the vicinity of an LTE SC 930 and an LTE UE 940. The Wi-Fi AP 910 may serve one or more STAs 950, shown in the singular for illustration purposes.

In general, the Wi-Fi AP 910 includes various components for providing and processing services related to over-the-air and backhaul connectivity. For example, the Wi-Fi AP 910 may include a transceiver 912 for over-the-air WLAN communication with the STAs 950 and a backhaul controller 914 for backhaul communications with other network devices. These components may operate under the direction of a processor 916 in conjunction with memory 918, for example, all of which may be interconnected via a bus 920 or the like.

In addition and in accordance with the discussion above, the Wi-Fi AP 910 may also further include a signal energy monitor 922 for monitoring signaling energy on a communication channel in the unlicensed frequency band, a waveform comparator 924 for comparing the monitored signal energy with a known waveform signature corresponding to LTE (e.g., from an LTE waveform signatures database 919 stored in the memory 918), and an interference identifier 926 for identifying therefrom the presence of any LTE interferers. The Wi-Fi AP 910 may also include an interference classifier 928 for classifying the type of interference being observed and an interference moderator 929 for performing interference avoidance and/or mitigation as appropriate. It will be appreciated that in some designs one or more or all of these operations may be performed by or in conjunction with the processor 916 and memory 918.

Figure 10:
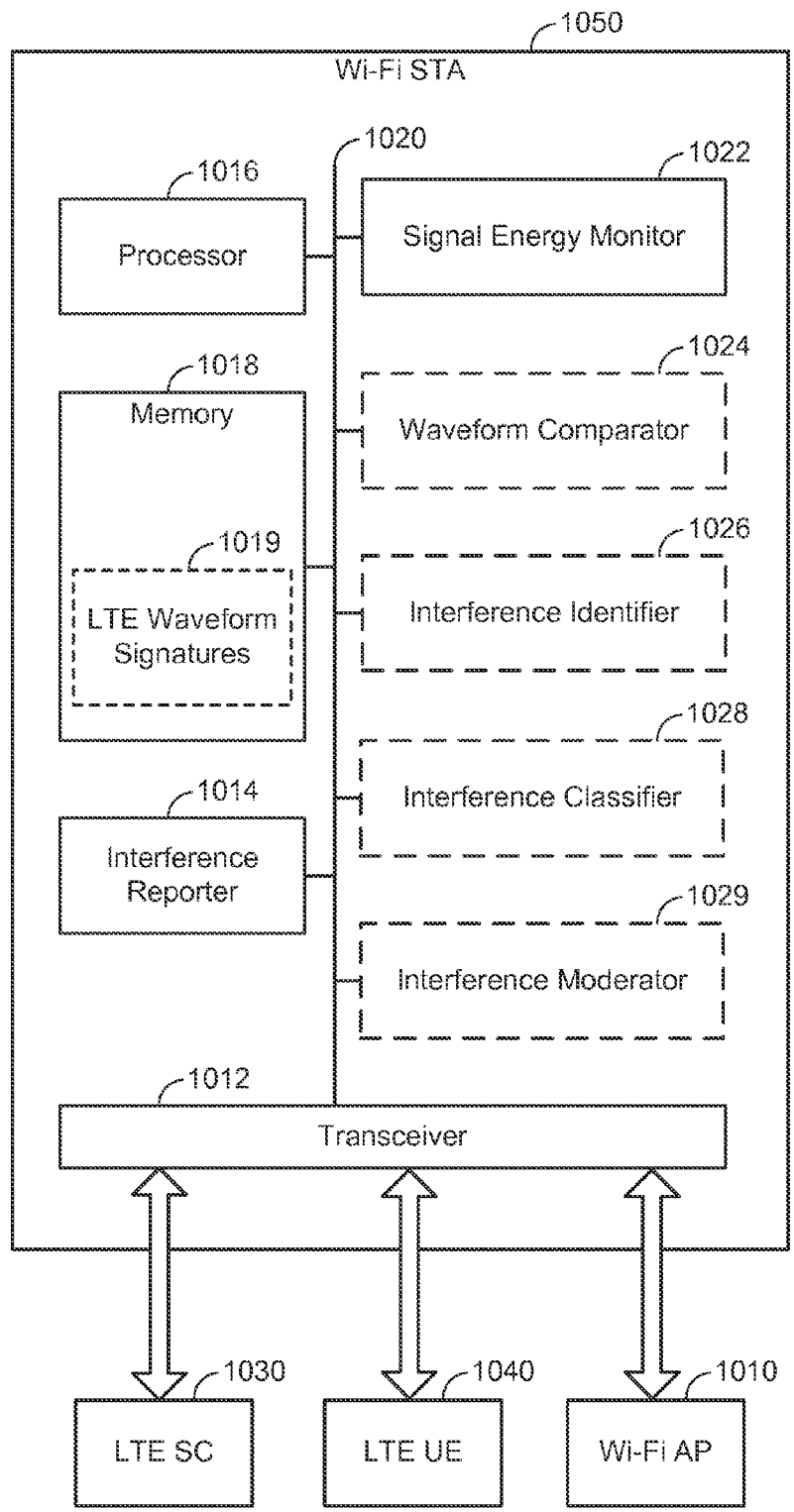
FIG. 10 illustrates the configuration of an example Wi-Fi STA for assisting a Wi-Fi AP in managing co-channel LTE interference in a wireless communication network.

FIG. 10 illustrates the configuration of an example Wi-Fi STA for assisting a Wi-Fi AP in managing co-channel LTE interference in a wireless communication network. In this example, an STA 1050 assisting a Wi-Fi AP 1010 is deployed in the vicinity of an LTE SC 1030 and an LTE UE 1040, which may or may not be directly visible to the Wi-Fi AP 1010. The Wi-Fi AP 1010 may serve the STA 1050 along with one or more other STAs (not shown).

In general, the STA 1050 includes various components for providing and processing services related to over-the-air connectivity. For example, the STA 1050 may include a transceiver 1012 for over-the-air WLAN communication with the Wi-Fi AP 1010, which may operate under the direction of a processor 1016 in conjunction with memory 1018, for example, all of which may be interconnected via a bus 1020 or the like.

In addition and in accordance with the discussion above, the STA 1050 may also further include a signal energy monitor 1022 for monitoring signaling energy on a communication channel in the unlicensed frequency band and an interference reporter 1014 for reporting signal energy measurements or other information (e.g., 802.11k RRM reports) to the Wi-Fi AP 1010. Depending on the amount of processing performed directly, the STA 1050 may also include a waveform comparator 1024 for comparing the monitored signal energy with a known waveform signature corresponding to LTE (e.g., from an LTE waveform signatures database 1019 stored in the memory 1018), an interference identifier 1026 for identifying therefrom the presence of any LTE interferers, an interference classifier 1028 for classifying the type of interference being observed, and an interference moderator 1029 for performing interference avoidance and/or mitigation as appropriate. It will be appreciated that in some designs one or more or all of these operations may be performed by or in conjunction with the processor 1016 and memory 1018.

Figure 11:
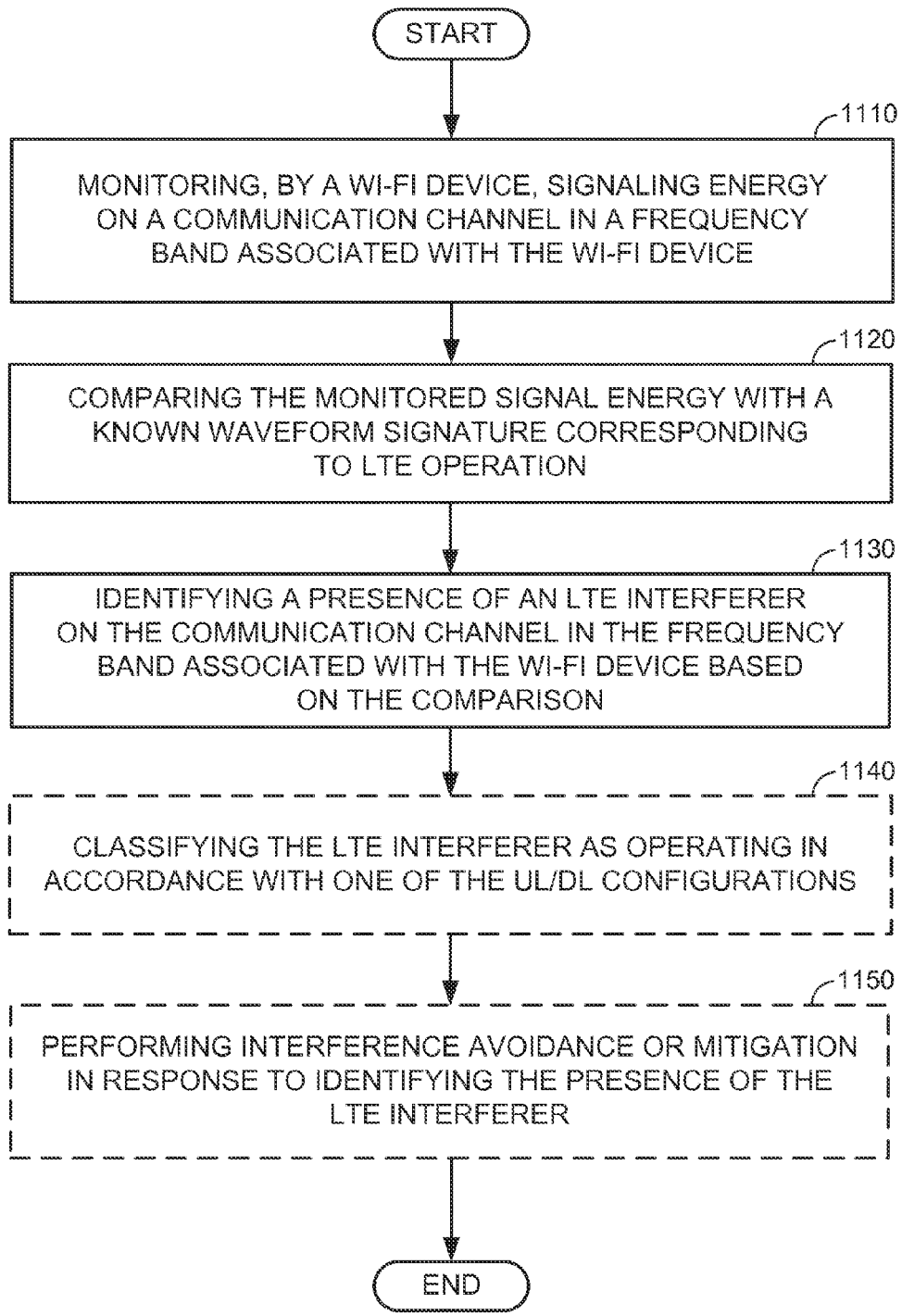
FIG. 11 is a flow diagram illustrating an example method for interference management by a Wi-Fi device.

FIG. 11 is a flow diagram illustrating an example method for interference management by a Wi-Fi device. As shown, the method may include monitoring, by a Wi-Fi device, signaling energy on a communication channel in a frequency band associated with the Wi-Fi device (block 1110), comparing the monitored signal energy with a known waveform signature corresponding to LTE operation (block 1120), and identifying a presence of an LTE interferer on the communication channel in the frequency band associated with the Wi-Fi device based on the comparison (block 1130). The method may also include classifying the LTE interferer as operating in accordance with one of the UL/DL configurations (block 1140) and performing interference avoidance or mitigation in response to identifying the presence of the LTE interferer (block 1150). The classification process may be based on a correlation of a periodicity of the monitored signaling energy with a plurality of predefined patterns associated with LTE UL/DL configurations, as discussed above with reference to FIG. 7.

As discussed in more detail above, the interference avoidance may include, for example, (a) switching operating channels (e.g., based on a switching threshold associated with the presence of the LTE interferer) and/or (b) interference-aware, multi-user scheduling of Wi-Fi STAs based on the UL/DL configuration. The interference mitigation may include, for example, (a) dual-rate control based on the UL/DL configuration, (b) TXOP scheduling to align with UL/DL subframe boundaries, (c) prevention of transmission during high interference periods (e.g., CTS2S), and/or (d) interference nulling using multiple antennas at the Wi-Fi device.

The methodology of FIG. 11 may be performed by any Wi-Fi device including both Wi-Fi APs and STAs, acting alone or in combination (e.g., STA-assisted). For example, the monitoring may be performed by a Wi-Fi STA and the comparing and identifying may be performed by a Wi-Fi AP. In this example, the Wi-Fi STA may report to the Wi-Fi AP the monitored signal energy (e.g., using the IEEE 802.11k framework). Alternatively, the monitoring may be performed by the Wi-Fi AP directly, using its Wi-Fi receiver circuitry.

Figure 12:
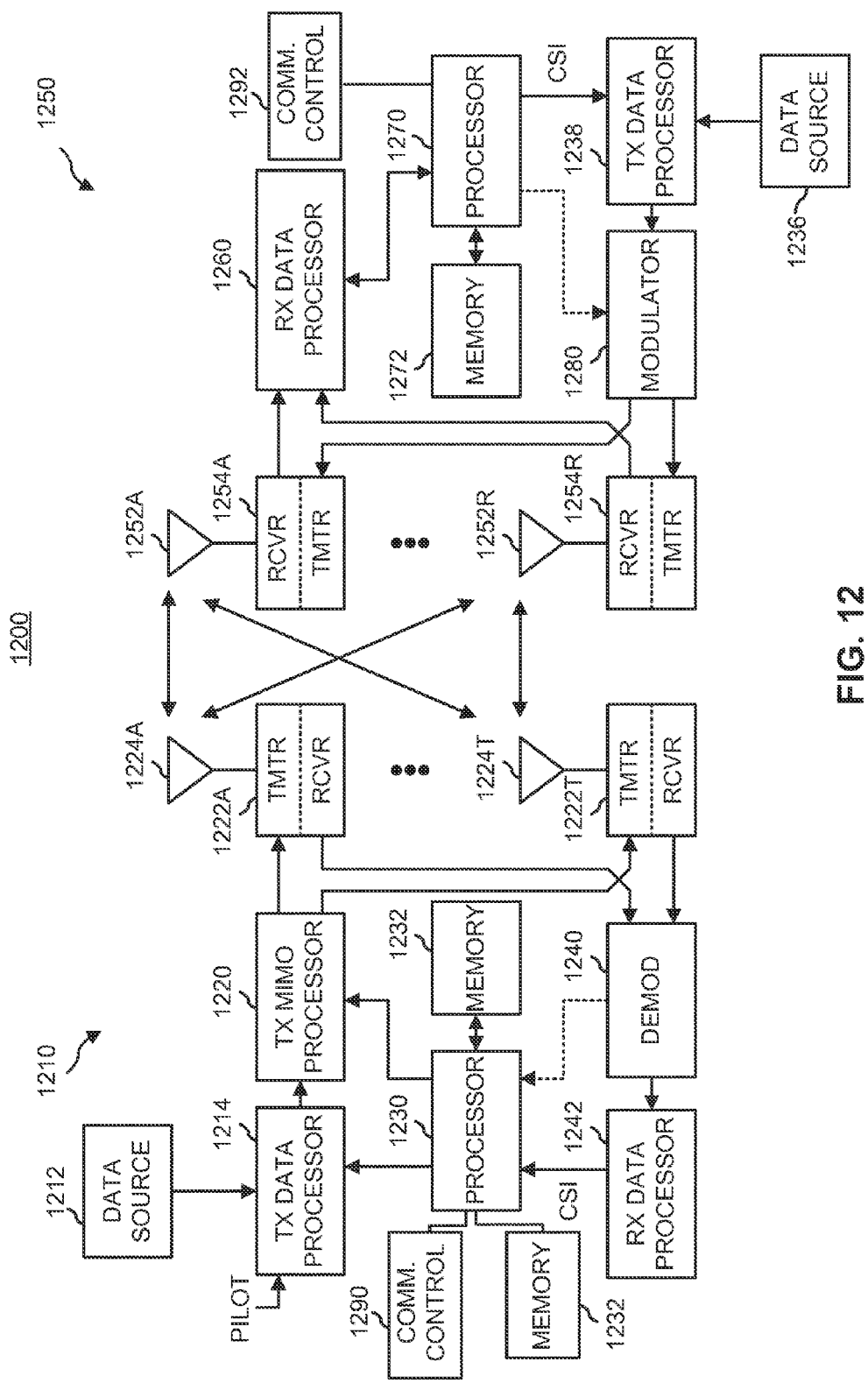
FIG. 12 illustrates in more detail the principles of wireless communication between a wireless device (e.g., a base station) and a wireless device (e.g., a user device) of a sample communication system that may be adapted as described herein.

FIG. 12 illustrates in more detail the principles of wireless communication between a wireless device 1210 (e.g., a base station) and a wireless device 1250 (e.g., a user device) of a sample communication system 1200 that may be adapted as described herein. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides NT modulation symbol streams to NT transceivers (XCVR) 1222A through 1222T. In some aspects, the TX MIMO processor 1220 applies beamforming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1222A through 1222T are then transmitted from NT antennas 1224A through 1224T, respectively.

At the device 1250, the transmitted modulated signals are received by NR antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the NR received symbol streams from NR transceivers 1254 based on a particular receiver processing technique to provide NT "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform LTE interference management operations for a Wi-Fi device as taught herein. For example, a communication (COMM.) component 1290 may cooperate with the processor 1230 and/or other components of the device 1210 to perform LTE interference management for Wi-Fi as taught herein. Similarly, a communication control component 1292 may cooperate with the processor 1270 and/or other components of the device 1250 to support LTE interference management for Wi-Fi as taught herein. It should be appreciated that for each device 1210 and 1250 the functionality of two or more of the described components may be provided by a single component. For example, a single processing component may provide the functionality of the communication control component 1290 and the processor 1230 and a single processing component may provide the functionality of the communication control component 1292 and the processor 1270.

Figure 13:
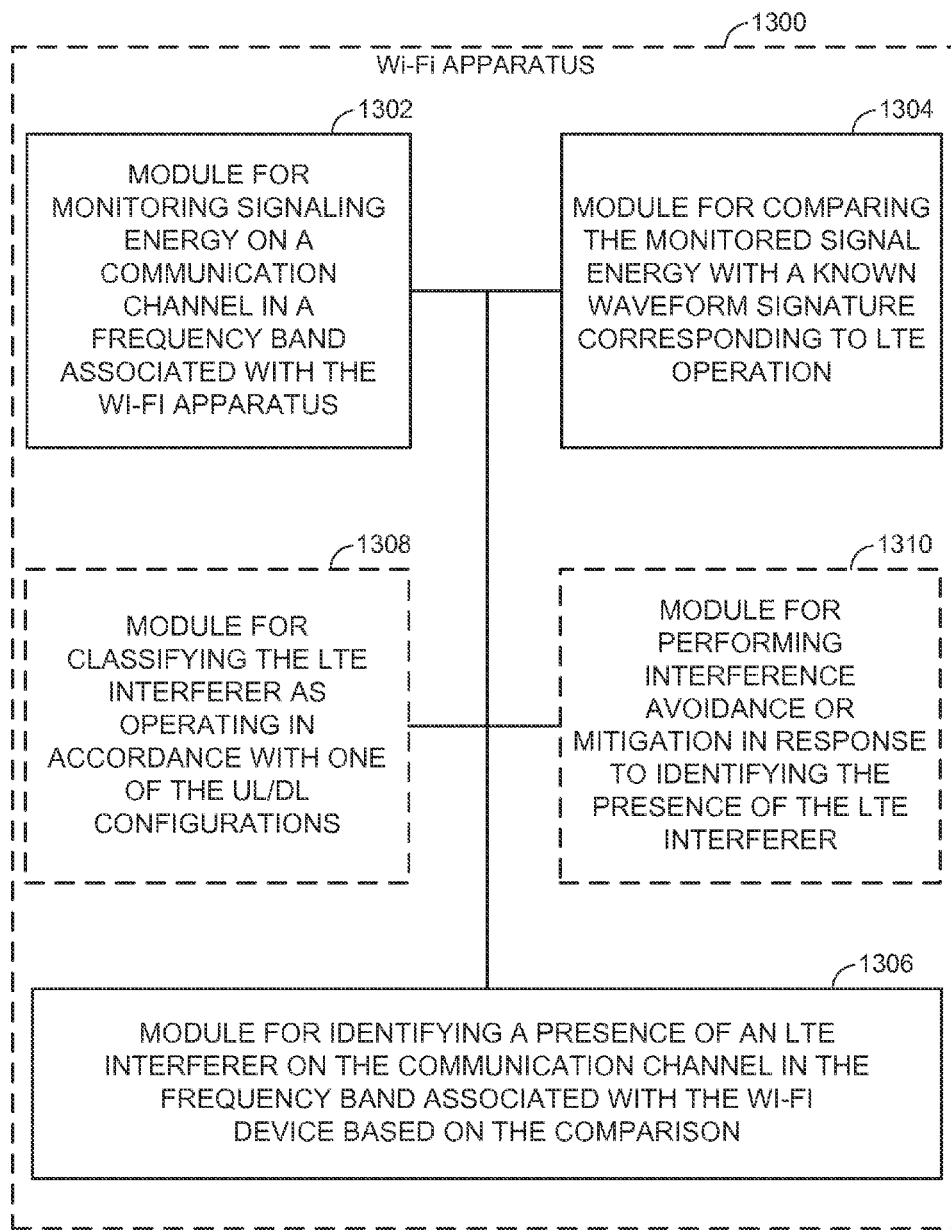
FIG. 13 illustrates an example Wi-Fi apparatus represented as a series of interrelated functional modules.

FIG. 13 illustrates an example Wi-Fi apparatus 1300 represented as a series of interrelated functional modules. A module for monitoring 1302 may correspond at least in some aspects to, for example, a communication device (e.g., a receiver) as discussed herein. A module for comparing 1304 may correspond at least in some aspects to, for example, a processing system as discussed herein. A module for identifying 1306 may correspond at least in some aspects to, for example, a processing system as discussed herein. An optional module for classifying 1308 may correspond at least in some aspects to, for example, a processing system as discussed herein. An optional module for performing 1304 may correspond at least in some aspects to, for example, a communication device (e.g., a transceiver) in conjunction with a processing system as discussed herein.

The functionality of the modules of FIG. 10 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 10 as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for interference management by a Wi-Fi device. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for interference management by a Wi-Fi device, the method comprising:
monitoring, by the Wi-Fi device, signaling energy on a communication channel in a frequency band associated with the Wi-Fi device;
comparing the monitored signaling energy with a known waveform signature corresponding to Long Term Evolution (LTE) operation;
identifying a presence of an LTE interferer on the communication channel in the frequency band associated with the Wi-Fi device based on the comparison;
correlating a periodicity of the monitored signaling energy with a plurality of predefined patterns associated with LTE uplink and downlink (UL/DL) configurations;
classifying the LTE interferer as operating in accordance with an associated one of the UL/DL configurations based on the correlation; and
performing interference mitigation based on the classification and the associated UL/DL configuration, wherein the interference mitigation comprises dual-rate control that maintains, based on the associated UL/DL configuration, separate power tracking loops for (i) packet transmissions during LTE UL subframes and (ii) packet transmissions during LTE DL subframes.

2. The method of claim 1, wherein the known waveform signature comprises a periodic signaling energy pattern with predefined transmission intervals characteristic of LTE operation.

3. The method of claim 1, further comprising performing interference avoidance that comprises switching operating channels based on a switching threshold associated with the presence of the LTE interferer.

4. The method of claim 1, further comprising performing interference mitigation that comprises interference nulling using multiple antennas at the Wi-Fi device.

5. The method of claim 1, further comprising performing interference avoidance that comprises interference-aware, multi-user scheduling of Wi-Fi subscriber stations (STAs) based on the associated UL/DL configuration.

6. The method of claim 1, wherein the monitoring is performed by a Wi-Fi receiver of the Wi-Fi device.

7. The method of claim 1, wherein the monitoring comprises receiving a report from another Wi-Fi device relating to the monitored signaling energy.

8. An apparatus for interference management by a Wi-Fi device, the apparatus comprising:
- a signal energy monitor configured to control monitoring, by the Wi-Fi device, signaling energy on a communication channel in a frequency band associated with the Wi-Fi device;
- a waveform comparator configured to compare the monitored signaling energy with a known waveform signature corresponding to Long Term Evolution (LTE) operation;
- an interference identifier configured to identify a presence of an LTE interferer on the communication channel in the frequency band associated with the Wi-Fi device based on the comparison;
- an interference classifier configured to correlate a periodicity of the monitored signaling energy with a plurality of predefined patterns associated with LTE uplink and downlink (UL/DL) configurations, and to classify the LTE interferer as operating in accordance with an associated one of the UL/DL configurations based on the correlation; and
- an interference moderator configured to perform interference mitigation based on the classification and the associated UL/DL configuration, wherein the interference moderator is configured to perform the interference mitigation by dual-rate control that maintains, based on the associated UL/DL configuration, separate power tracking loops for (i) packet transmissions during LTE UL subframes and (ii) packet transmissions during LTE DL subframes.

9. The apparatus of claim 8, wherein the known waveform signature comprises a periodic signaling energy pattern with predefined transmission intervals characteristic of LTE operation.

10. The apparatus of claim 8, wherein the interference moderator is further configured to perform interference avoidance that comprises switching operating channels based on a switching threshold associated with the presence of the LTE interferer.

11. The apparatus of claim 8, wherein the interference moderator is further configured to perform interference mitigation that comprises interference nulling using multiple antennas at the Wi-Fi device.

12. The apparatus of claim 8, wherein the interference moderator is further configured to perform interference avoidance that comprises interference-aware, multi-user scheduling of Wi-Fi subscriber stations (STAs) based on the associated UL/DL configuration.

13. The apparatus of claim 8, wherein the signal energy monitor comprises a Wi-Fi receiver of the Wi-Fi device.

14. The apparatus of claim 8, wherein the signal energy monitor comprises a receiver configured to receive a report from another Wi-Fi device relating to the monitored signaling energy.

15. An apparatus for interference management by a Wi-Fi device, the apparatus comprising:
- means for monitoring, by the Wi-Fi device, signaling energy on a communication channel in a frequency band associated with the Wi-Fi device;
- means for comparing the monitored signaling energy with a known waveform signature corresponding to Long Term Evolution (LTE) operation;
- means for identifying a presence of an LTE interferer on the communication channel in the frequency band associated with the Wi-Fi device based on the comparison;
- means for correlating a periodicity of the monitored signaling energy with a plurality of predefined patterns associated with LTE uplink and downlink (UL/DL) configurations;
- means for classifying the LTE interferer as operating in accordance with an associated one of the UL/DL configurations based on the correlation; and
- means for performing interference mitigation based on the classification and the associated UL/DL configuration, wherein the interference mitigation comprises dual-rate control that maintains, based on the associated UL/DL configuration, separate power tracking loops for (i) packet transmissions during LTE UL subframes and (ii) packet transmissions during LTE DL subframes.

16. The apparatus of claim 15, wherein the known waveform signature comprises a periodic signaling energy pattern with predefined transmission intervals characteristic of LTE operation.

17. The apparatus of claim 15, further comprising means for performing (i) interference avoidance that comprises switching operating channels based on a switching threshold associated with the presence of the LTE interferer or (ii) interference mitigation that comprises interference nulling using multiple antennas at the Wi-Fi device.

18. An apparatus for interference management by a Wi-Fi device, the apparatus comprising:
- a processor configured to:
    - monitor, by the Wi-Fi device, signaling energy on a communication channel in a frequency band associated with the Wi-Fi device,
    - compare the monitored signaling energy with a known waveform signature corresponding to Long Term Evolution (LTE) operation,
    - identify a presence of an LTE interferer on the communication channel in the frequency band associated with the Wi-Fi device based on the comparison,
    - correlate a periodicity of the monitored signaling energy with a plurality of predefined patterns associated with LTE uplink and downlink (UL/DL) configurations,
    - classify the LTE interferer as operating in accordance with an associated one of the UL/DL configurations based on the correlation, and
    - perform interference mitigation based on the classification and the associated UL/DL configuration, wherein the interference mitigation comprises dual-rate control that maintains, based on the associated UL/DL configuration, separate power tracking loops for (i) packet transmissions during LTE UL subframes and (ii) packet transmissions during LTE DL subframes; and
- memory coupled to the processor and configured to store data and instructions.

19. The apparatus of claim 18, wherein the known waveform signature comprises a periodic signaling energy pattern with predefined transmission intervals characteristic of LTE operation.

20. The apparatus of claim 18, wherein the processor is further configured to perform (i) interference avoidance that comprises switching operating channels based on a switching threshold associated with the presence of the LTE interferer or (ii) interference mitigation that comprises interference nulling using multiple antennas at the Wi-Fi device.

21. A non-transitory computer-readable medium comprising
instructions, which, when executed by a processor, cause the processor to perform operations for interference management by a Wi-Fi device, the non-transitory computer-readable medium comprising:
code for monitoring, by the Wi-Fi device, signaling energy on a communication channel in a frequency band associated with the Wi-Fi device;
code for comparing the monitored signaling energy with a known waveform signature corresponding to Long Term Evolution (LTE) operation;
code for identifying a presence of an LTE interferer on the communication channel in the frequency band associated with the Wi-Fi device based on the comparison;
code for correlating a periodicity of the monitored signaling energy with a plurality of predefined patterns associated with LTE uplink and downlink (UL/DL) configurations;
code for classifying the LTE interferer as operating in accordance with an associated one of the UL/DL configurations based on the correlation; and
code for performing interference mitigation based on the classification and associated UL/DL configuration, wherein the interference mitigation comprises dual-rate control that maintains, based on the associated UL/DL configuration, separate power tracking loops for (i) packet transmissions during LTE UL subframes and (ii) packet transmissions during LTE DL subframes.

22. The non-transitory computer-readable medium of claim 21, wherein the known waveform signature comprises a periodic signaling energy pattern with predefined transmission intervals characteristic of LTE operation.

23. The non-transitory computer-readable medium of claim 21, further comprising code for performing (i) interference avoidance that comprises switching operating channels based on a switching threshold associated with the presence of the LTE interferer or (ii) interference mitigation that comprises interference nulling using multiple antennas at the Wi-Fi device.

* * * * *